United States Patent [19]

Cheung

[11] 4,245,246
[45] Jan. 13, 1981

[54] PAY TV SYSTEM

[76] Inventor: Shiu H. Cheung, 95B Robinson Rd., Hong Kong, Hong Kong

[21] Appl. No.: 930,496

[22] Filed: Aug. 3, 1978

[30] Foreign Application Priority Data

Nov. 18, 1977 [GB] United Kingdom ............... 48079/77

[51] Int. Cl.³ ................................................ H04N 7/16
[52] U.S. Cl. ..................................... 358/124; 358/117; 358/121; 358/122
[58] Field of Search ............... 358/114, 117, 122–124, 358/121

[56] References Cited

U.S. PATENT DOCUMENTS

| 3,777,053 | 12/1973 | Wittig et al. | 358/117 |
|---|---|---|---|
| 3,801,732 | 4/1974 | Reeves | 358/124 |
| 3,919,462 | 11/1975 | Hartung et al. | 358/124 |
| 3,924,059 | 12/1975 | Horowitz | 358/124 |
| 4,022,972 | 5/1977 | Pires | 358/124 |
| 4,025,948 | 5/1977 | Loshin | 358/124 |
| 4,081,832 | 3/1978 | Sherman | 358/124 |
| 4,115,807 | 9/1978 | Pires | 358/124 |

Primary Examiner—Stephen C. Buczinski
Attorney, Agent, or Firm—Kinzer, Plyer, Dorn & McEachran

[57] ABSTRACT

An apparatus for coding video information arranged in a plurality of lines comprises means for selectively inverting video information in groups of lines. A random timing device controls the number of lines in successive groups. The video signals in one group are inverted and the video signals in the succeeding group are non-inverted.

5 Claims, 5 Drawing Figures

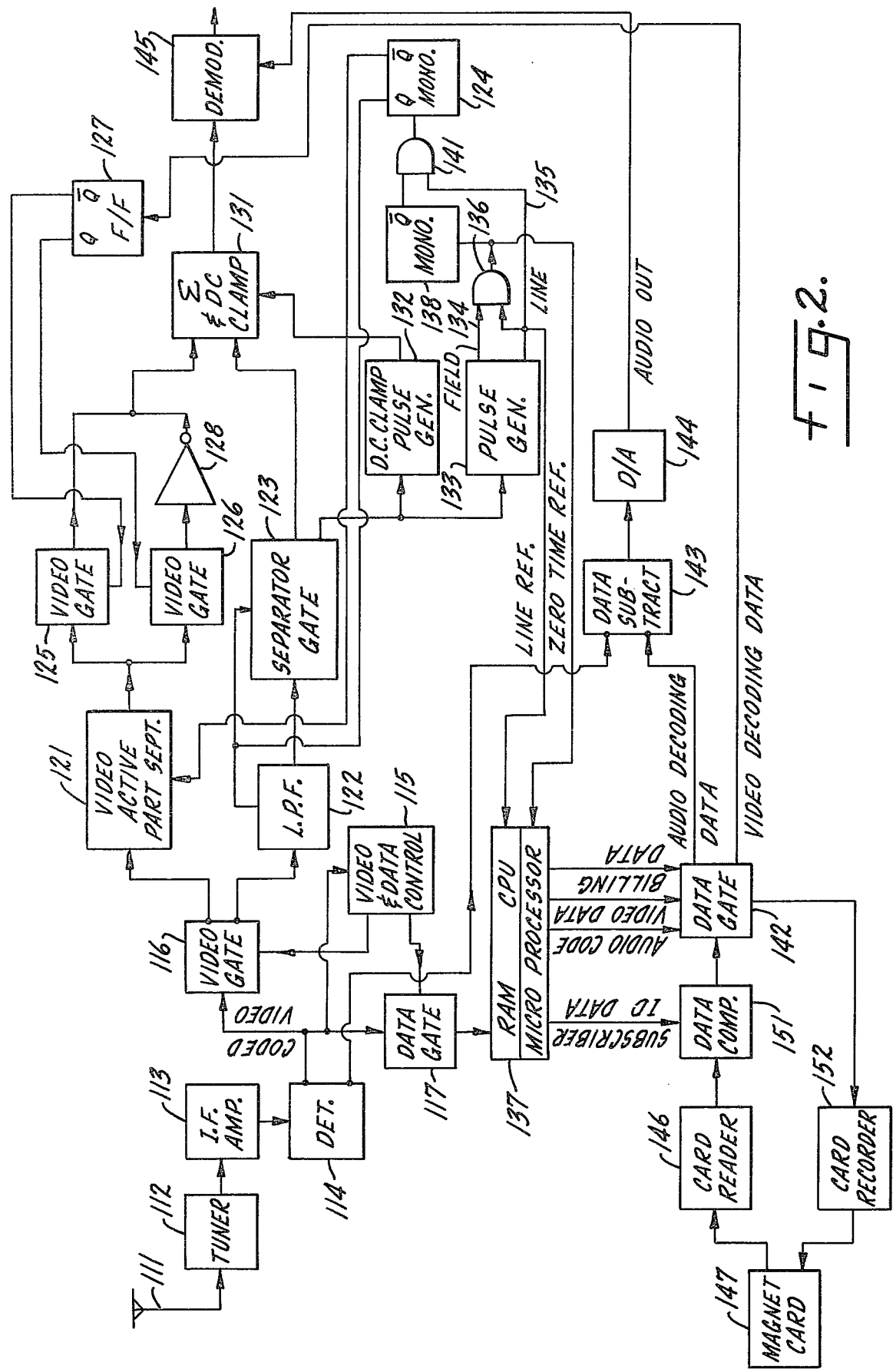

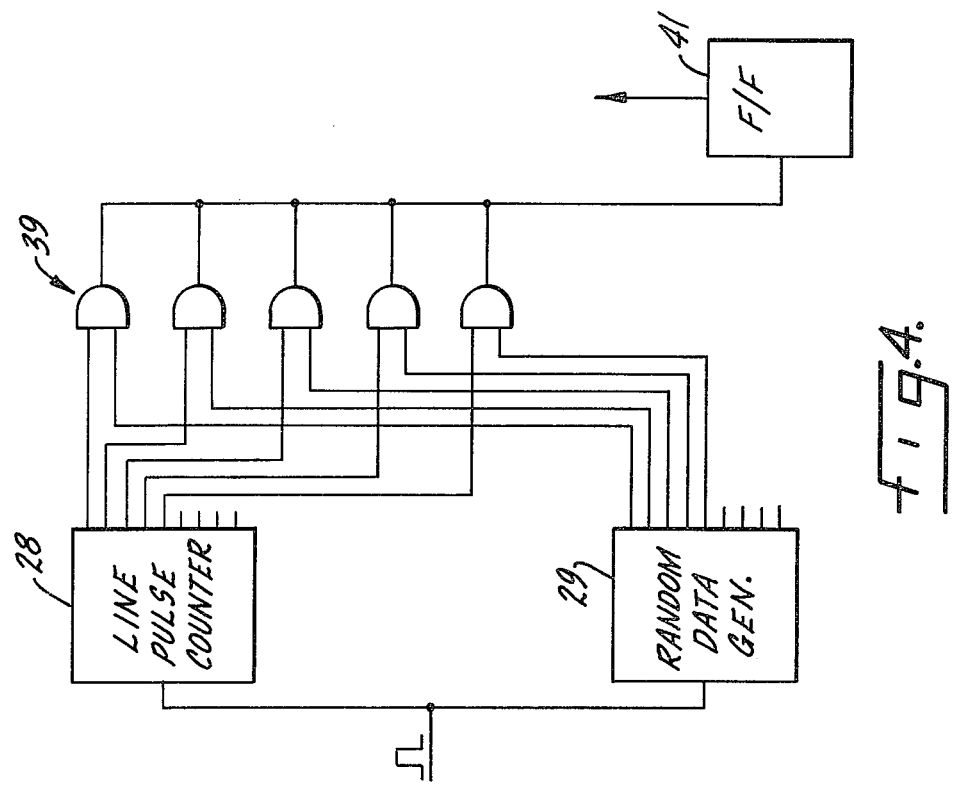
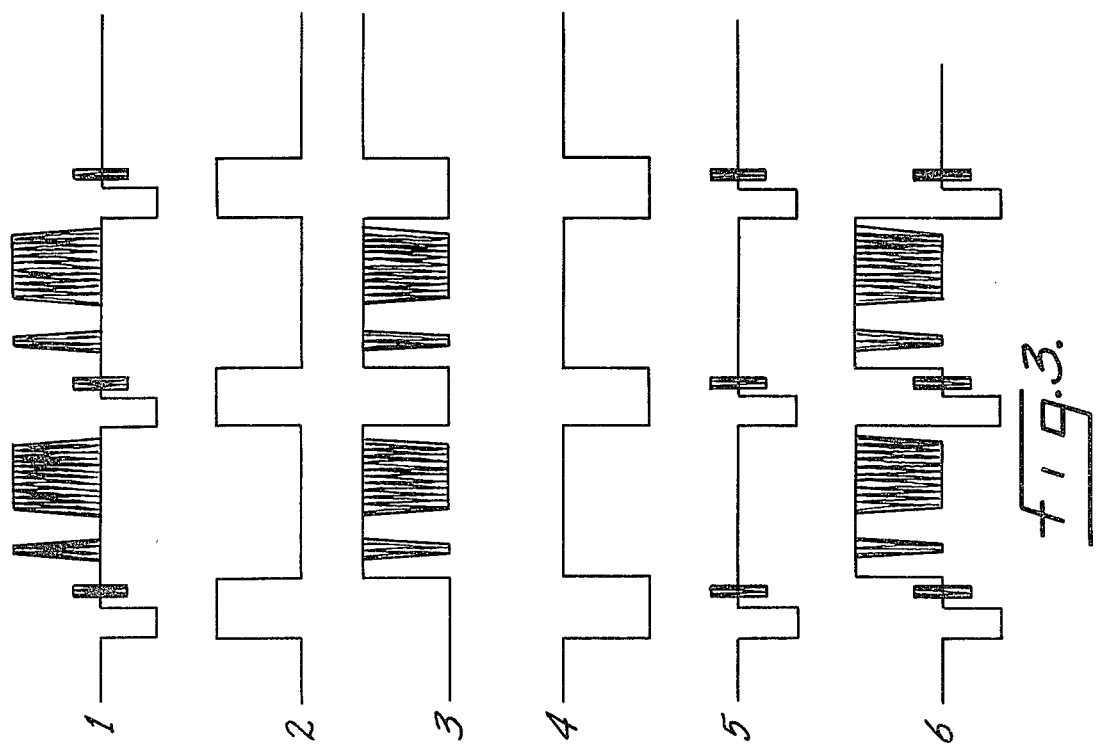

PAY TV SYSTEM

This invention relates to coding of information.

When information is transmitted and it is desired to charge for the information, it is usually necessary to code the information so that only receivers with appropriate decoders can receive the information intelligibly. This coding is used in Pay-TV systems where subscribers pay a Pay-TV company for the use of the equipment besides paying any licence fee which may be statutorily imposed. The use of the equipment is metered and the subscriber is charged accordingly.

According to one aspect of the invention there is provided apparatus for coding video information arranged in a plurality of lines comprising means for selectively inverting video information in groups of lines and a random timing device to control the number of lines in successive groups, the video signals in one group being inverted and the video signals in the succeeding groups being non-inverted.

According to another aspect of the invention there is provided apparatus for coding video and audio information comprising apparatus as set out in the preceding paragraph wherein the random timing device comprises means for generating a random digital number, together with means for converting audio information into a digital signal and means to add the digital signals of said random timing device and the converted audio signals to modulate the coded video information.

According to a further aspect of the invention there is provided apparatus for transmitting and receiving video information comprising apparatus as set out in the last paragraph but one together with a transmitter for transmitting the coded video information and data from said random timing device, a receiver responsive to said data from said random timing device in the transmitted signal to control a decoding device to restore all the lines of the video information from the transmitted signal to their non-inverted form for presentation at a receiver display unit.

An example of the invention will now be described with reference to the accompanying drawings, in which:

FIG. 2 is a block diagram of a decoding unit to decode signals from an antenna to feed the antenna input of a standard receiver with decoded signals;

FIG. 3 shows wave forms appearing in the above apparatus; and

FIG. 4 shows a detail of the apparatus of FIG. 1.

Figure 1A:
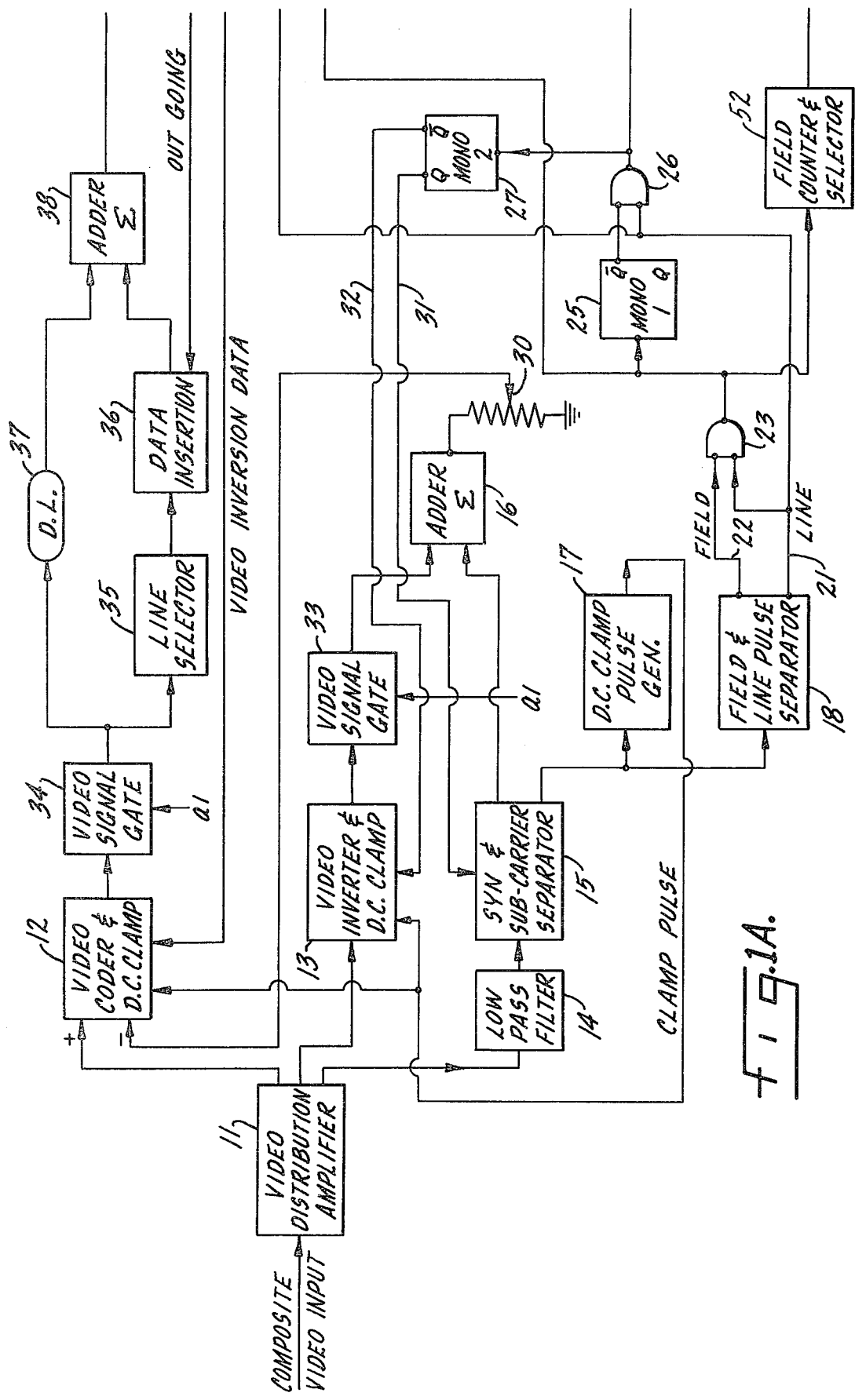
FIG. 1 (comprising FIGS. 1A and 1B) is a block diagram of a coding unit to code a video input and an audio input for supply to a transmitter.
Figure 1B:
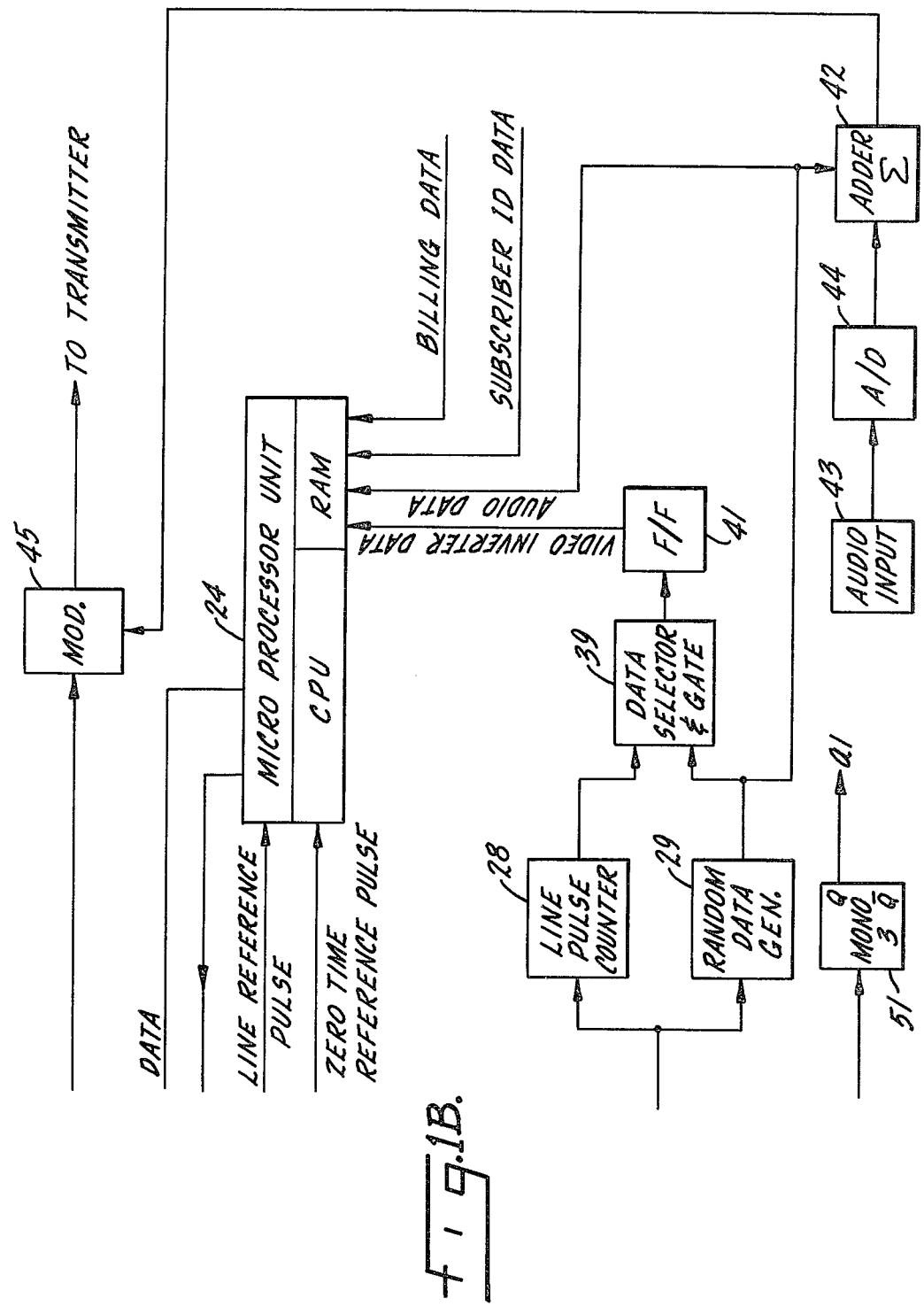

Wave form 1 of FIG. 3 shows the composite video input which is amplified at a video distribution amplifier 11 in FIG. 1. The composite video input comprises, for each line of the picture, an initial negative-going DC pulse, a short synchronising burst of high frequency signals, followed by high frequency signals of positive polarity which are amplitude modulated according to the video information contained in that line. At the beginning of each field, before the signals representing the first line of the field, there are transmitted a series of equalising pulses (not shown) in order to synchronise the start of a picture at the transmitter with the pictures at the receivers.

In the standard television transmission the line signals of DC pulse, synchronising burst and positive going video information signals are transmitted as they are.

Some known systems code the line signals in order to prevent comprehensible reception by receivers without a decoder. Such systems can be used by Pay-TV companies in order to restrict reception to current subscribers. One known method of coding is periodically to invert the video information signals so that they become of negative polarity (see wave form 3 of FIG. 3) rather than of positive polarity as wave form 1 of FIG. 3. I believe that the known coding methods use a regular inversion frequency. This has the advantage that the coder and decoders can be built to operate at that frequency, but has the disadvantage that the frequency cannot be altered. The apparatus described below uses an irregular pattern of inversions, controlled by a random data generator at the transmitter. With the coded video information, the transmitter transmits inversion data which controls the decoders at the receivers to restore the inverted portions of the video information in synchronism with the coder.

The DC pulse and synchronising burst at the start of each line are not inverted. They are separated from the video information signals (wave form 5 of FIG. 3) and re-combined with the video information signals after the latter signals have been selectively inverted, the re-combined signals then having data added at the start of each field and having audio signals added in the usual manner, before transmission.

The amplified composite video input is applied from the amplifier 11 to one input of a video coder unit 12 which includes a DC clamp. The same signal is also applied to a video inverter 13 and through a low pass filter 14 to a synchronisation and sub-carrier separator unit 15. The separator responds to the initial DC pulse and synchronising burst signals at the beginning of each line and feeds these signals to an adder unit 16 and also to a DC clamp pulse generator 17 and field and line pulse separator unit 18 which gives a line reference pulse at the beginning of each line at a line output 21 and an output at the beginning of each field on a field output 22. The line reference pulse from 21 is applied directly to a micro-processor unit 24 and to two AND gates 23 and 26. The output from 22 is also applied to the AND gate 23 which will therefore be energised at the beginning of each field to provide a zero time reference pulse to the micro-processor unit 24, and to a first monostable vibrator 25 which has the effect of delaying the zero time reference pulse for the period of the equalisation pulses at the beginning of a field before the first line. The delayed output from vibrator 25 is fed with the line output 21 to a second AND gate 26 to feed a second monostable vibrator 27, and also a line pulse counter 28 and a random data generator 29 to be described later. The monostable vibrator 27 has two outputs, one 31 actuating the synchronisation, and sub-carrier separator 15 by the wave form 4 of FIG. 3 and the other 32 energising the video inverter 13 by the wave form 2 of FIG. 3. It will be seen that the separator 15 is energised for a period starting at the beginning of the DC pulse of the composite video signal of wave form 1 for a period depending on the relaxation time of the second monostable vibrator 27, and the video inverter 13 is energised at the end of this period for the remainder of the line. The inverter 13 therefore inverts the video modulated portion of the composite input and this converted signal passes through a video signal gate 33 to the other input of the adder 16, the output of the adder 16, shown at wave form 6 of FIG. 3, being applied to the second input of the video coder 12 through a potentiometer 30.

The video coder 12 is controlled by a video inversion data signal from a micro-processor 24 and passes either the video modulated portion of the composite signal as shown in wave form 1 from the first input or the inverted video modulated portions from the other input as shown in wave form 3 of FIG. 3 to a video signal gate 34. As the DC levels of the video modulated signals may become upset by the coding, a DC clamp signal is applied to the video coder 12 from the DC clamp pulse generator 17 connected to the synchronisation and sub-carrier separator 15 which is responsive to the amplitude of the DC pulse passed by the low pass filter 14. The same DC clamp signal is applied to the video inverter 13.

The output of the video signal gate 34 is applied through two parallel arms to an adder 38, the first arm containing a line selector 35 and data insertion unit 36 in which outgoing data from the micro-processor 24 is applied to certain lines (for example the first five lines) of a field as controlled by the line selector 35. The other parallel arm contains a delay line 37 which is required since the line selector and data insertion device take a finite time to pass the signals in which data is to be inserted, and the delay line causes the signals in the two arms to reach the adder 38 after an equal delay.

As shown in FIG. 4, the line pulse counter 28 has a plurality of output lines, which it energises in turn in response to successive line reference pulses supplied from the AND gate 26. The random data generator 29 has a similar plurality of outputs each representing a digit of a number, and it generates a random digital number by energising random ones of these outputs during the period of a field. Respective outputs from the line pulse counter and the random data generator are connected to AND gates 39. The outputs of the AND gates are connected together to a flip-flop 41.

When the line pulse counter, in response to the appropriate number of line reference pulses, provides an output to an AND gate whose other input is energised by the random data generator, the gate provides an output to change the state of the flip-flop. When the line pulse counter, in response to another appropriate number of line reference pulses, provides an output on another AND gate whose other input is energised by the random data generator (corresponding to another digit of the randomly generated digital number), that other AND gate provides an output to change the state of the flip-flop back again. The alternation of the flip-flop continues until the end of the field when cessation of the line reference pulses resets the line pulse counter to zero and the random data generator to generate another number by energising another random selection of outputs.

The flip-flop 41 provides video inverter data to the random access memory of the micro-processor 24 which then feeds a signal on the video inversion data line to cause the video coder 12 to change from passing non-inverted video information to passing inverted video information or vice versa. The inversion pattern from the flip-flop 41 is also included by the micro-processor unit in the outgoing data to be included in the transmitted signal by the data insertion unit 36 so that the decoders at the receivers can operate in the same pattern to restore the receivers of current subscribers to display intelligible pictures. The output of the random data generator 29 also provides the digital number to an adder unit 42 whose other input is supplied by an audio input 43 converted to digital form by an analog/digital converter unit 44. The added digital numbers are applied to a modulator 45 which modulates the coded composite video and data signal to supply a coded video and audio signal to the transmitter. The digital number from the generator 29 is also fed as 'audio data' to the random access memory of the micro-processor 24.

In many cases, the selection of a small number of lines in each field for insertion of the data under the control of the line selector unit is found not to be sufficient, and occasionally a whole field is taken to transmit non-video data. If the fields are taken for this purpose at frequencies of less than one in fifty, preferably at most 1 in 100, the video information viewed at the receiver should not be degraded appreciably. To this purpose, the video signal gates 33 and 34 are provided in the output of the video coder 12 and video inverter 13 under the control of a third monostable vibrator 51 fed with an output from a field counter and selector 52 responsive to the zero time reference pulse from AND gate 23. After counting a predetermined number such as 100 of the zero time reference pulses, corresponding to 100 fields, the selector 52 actuates the monostable vibrator 51 which causes the video signal gates 33 and 34 to prevent passage of video information from the coder 12 and inverter 13, leaving a period equal to the relaxation time of the third monostable vibrator (for example one field) to be used for transmission of outgoing data.

The random access memory of the micro-processor 24 has other inputs from generators of signals representing the identity of present subscribers and the billing rate for the present programme and the audio data signal from the generator 29. These are processed in the micro-processor 24 as a composite outgoing data signal for insertion in the transmitted signal by the data insertion unit 36 during the lines selected by the selector unit 35 of each picture and during the whole field selected by the field selector unit 52.

At the receiver, an antenna 111 is connected through a tuner 112, intermediate frequency amplifier 113 and detector 114 to provide coded video signals which are fed to a video and data control unit 115. The transmitted signal may include a code to identify video information and data, to which code the unit 115 would be responsive. The control unit 115 alternately enables a video gate 116 and data gate 117 connected to the coded video signals. The video gate output is fed to a gate 121 for the video active portion of the signal (the carrier signal amplitude modulated by the video information), and through a low pass filter 122 to a gate 123 for the synchronisation and sub-carrier portion. The gates 121 and 123 are alternately enabled by a monostable vibrator 124 to be described. The video active portion is applied through two parallel arms through gates 125 and 126 controlled alternately by a flip-flop 127, the gate 126 feeding an inverter 128, and the combined output of the arms being fed to one input of an adder 131 whose other input is supplied by the synchronisation and sub-carrier separator gate 123. The separator gate 123 also energises a DC clamp pulse generator 132 which feeds a DC clamp pulse to the adder 131 in order to restore the DC level of the separated decoded and recombined signals.

Another output of the synchronisation and sub-carrier separator gate 123 is applied to a field and line pulse generator 133, generating field and line reference pulses on separate outputs 134 and 135 respectively, which are combined in an AND gate 136 to provide a zero time reference pulse which is fed to a receiver micro-processor 137 and to a monostable vibrator 138 which provides a delay during the blanking period at the start of each field as did the vibrator 25 in the transmitter. The delayed zero time reference pulse is fed with the line reference pulse to a further AND gate 141 connected to the monostable vibrator 124 whose alternate outputs control the alternate operation of the video active portion separator gate 121 and synchronisation and sub-carrier separator gate 123 so that the gates act during the periods of each line appropriate to the synchronisation and sub-carrier portions and the video active portions.

The data from the data gate 117 is applied to the micro-processor 137 which extracts the audio code, the video data and the billing data to a further data gate 142. The output of the gate 142, when enabled, is fed to a data subtract unit 143 which is also supplied with a direct signal from the detector 114 and its output provides the audio signal in digital form, converted to analog form by a digital/analog converter 144 which is then applied to a de-modulator unit 145 connected to the adder 131 from the video portion of the de-coding circuit, the output of the de-modulator 145 being applied to the antenna input of a standard receiver. The data gate 142 also supplies video de-coding data to operate the flip-flop 127 causing alternate operation of the two video gates 125 and 126 already described.

Each subscriber has a card 147 on which information is recorded magnetically of the subscribers identity and which can receive input information according to which the subscriber is to be charged for his use of the apparatus. A card reader 146 reads the subscriber identity information on the magnetic card 147 which is compared with subscriber identity information received from the transmitter and extracted from the received signal in the micro-processor in a comparator 151 and, provided the subscriber is included among the list of current subscribers transmitted with the data from the transmitter, the data gate 142 is enabled to allow passage of audio and video de-coding data to the apparatus as described above. The data gate 142, when enabled, also passes billing data to a card recorder 152 which will record the appropriate billing information on the card 147. The card 147 is processed at intervals to extract the recorded billing information and the subscriber is charged accordingly.

What I claim is:

1. Apparatus for coding video information arranged in a plurality of lines comprising means for selectively inverting video information in groups of lines, each group of lines being less than a full field and consisting of one or more lines, a random timing device to control the number of lines in successive groups, said random timing device including a plurality of AND gates and a random data generator connected to each gate, a line counter connected to each AND gate, with any AND gate providing a video inversion signal when it has simultaneous inputs from said line counter and random data generator, the video signals in one group being inverted and the video signals in the succeeding group being non-inverted, said random timing device being reset to an initial condition at the start of each field, means for converting audio information into a digital signal, and means to add the digital signals of said random data generator and the converted audio signals to provide a coded audio signal.

2. Apparatus as claimed in claim 1, wherein said inverter comprises means for separating the video information signals in a line signal from the synchronisation and sub-carrier signals, means for selectively inverting the video information signals and means for combining the selectively inverted video signals with the synchronisation and sub-carrier signals.

3. Apparatus as claimed in claim 2 comprising a DC clamp pulse generator to control the DC level of the video information signals in said inverting means.

4. Apparatus as claimed in claim 1 further comprising means to insert data information in place of video information on certain of said lines.

5. Apparatus as claimed in claim 4 further comprising means selectively to insert data in place of video information in a complete field.

* * * * *